2,960,268
Patented Nov. 15, 1960

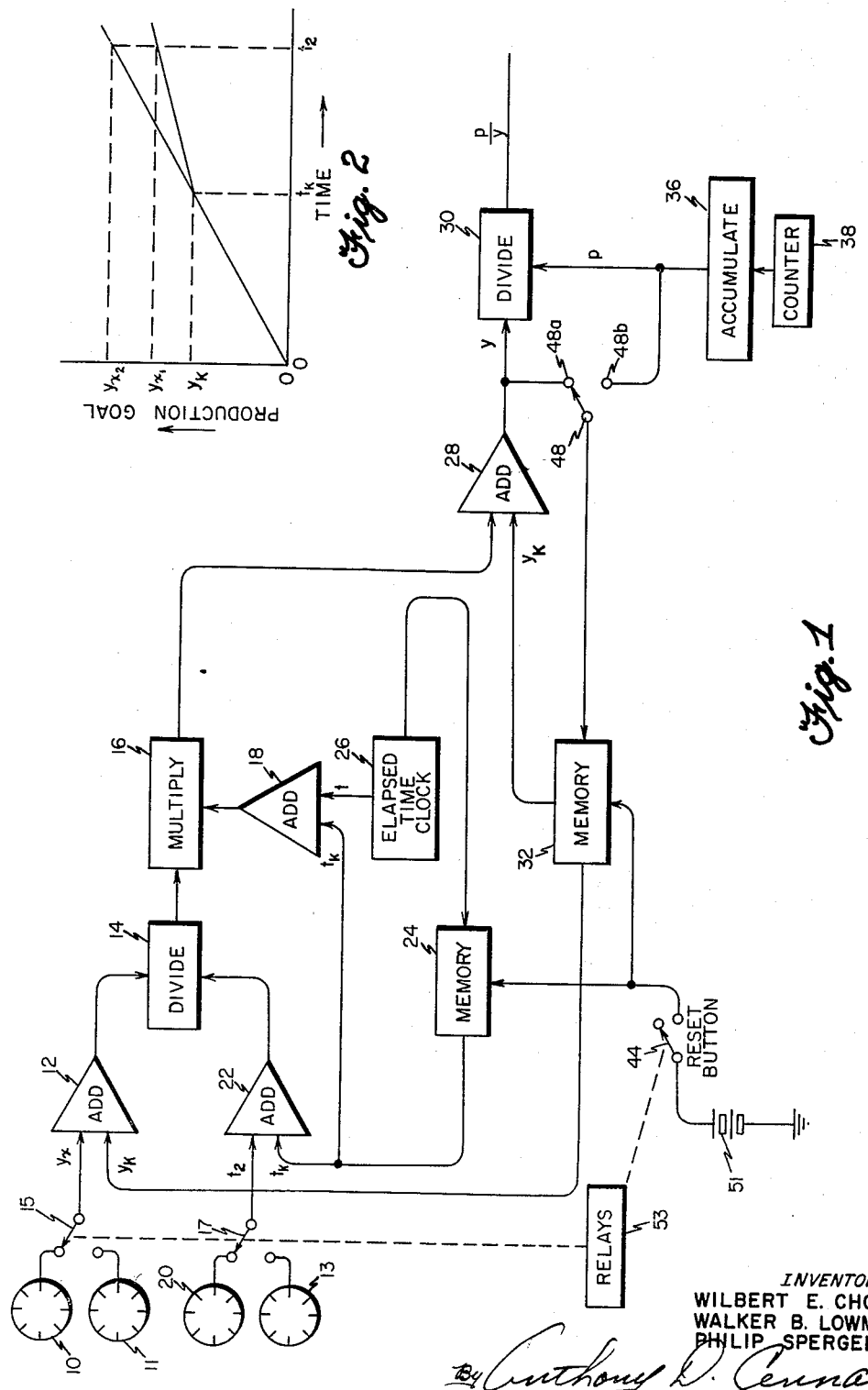

2,960,268
RATIO COMPUTER

Wilbert E. Chope, Walker B. Lowman, and Philip Spergel, Columbus, Ohio, assignors to Industrial Nucleonics Corporation, a corporation of Ohio Filed Mar. 26, 1958, Ser. No. 724,164

11 Claims. (Cl. 235—193)

This invention relates to a production ratio computer and more specifically to method and means for determining the ratio of quantities or qualities of the pieces produced from a continuous production line to the goal set for the number of pieces desired to be produced by the process or measures of their qualities.

In all manufacturing processes, there are a number of variables that describe conditions of the process, such as, the speed of the process, the number of pieces produced, and the weight of the pieces. These variables are generally found in two areas, quality and quantity. In either area, the manufacturer can set a goal figure, while measurements of the process and product define actual qualities and quantities which may or may not coincide with the goal. It is quite important for the operator of a manufacturing process to know at all times how closely the qualities and quantities of his process and product attain to the goals. A single statistic which contains this information is the ratio of the actual quality or quantity to the goal.

In the past it has been customary to establish goals for qualities and quantities relating to the production and then to measure by whatever means was available the actual quality or quantity. From these figures the operator would draw his conclusions as to the relationship of the two values. To complicate matters further many manufacturing processes today are continuous, that is, the product produced is formed in one manner or another from a continuous sheet, rod, web, etc., of material. The actual values of the variables are determined in most instances by the sampling method and then compared with the goal desired.

The present invention provides a system for automatically and continuously computing for ratio between the quantity and quality of a product and the desired goal.

It is accordingly an object of the present invention to provide a single accurate statistic which can serve as the basis for vital operating decisions.

It is another object of the present invention to automatically compute the ratio between actual measurement of a variable of a product from a manufacturing process and the goal set by the operator of the process.

It is a further object to compute the ratio between the actual measurement of a variable and a goal of a product produced by a continuous process.

Another object is to compute the ratio between the actual measurement of a variable and a goal that has been changed from time to time for a continuous process.

Still another object is to provide apparatus for computing the ratio between the actual measurement of a variable and a goal that is simple and inexpensive in construction and readily adaptable to present day manufacturing processes.

Other objects and features of the present invention will become apparent from the following detailed description when taken in conjunction with the drawings in which:

Fig. 1 is a block diagram schematically illustrating a typical embodiment of a production ratio computer of the present invention.

Fig. 2 is a graphical representation of production goal versus production.

A mathematical representation of the number of pieces that should have been produced up to any moment, with a goal that has been changed and uniform production rates before and after goal change is:

$$y = \frac{y_x - y_k}{t_2 - t_k}(t - t_k) + y_k$$

where:

$t$ = elapsed time
$y_x$ = total production goal
$y_k$ = production at time $t_k$ when goal is changed during production time
$t_k$ = time when goal is changed
$t_2$ = total production time, i.e., duration of production period
$y$ = goal at any time $t$ This equation defines the value of a goal at any time $t$ when the total goal $y_x$ for a production period is set. If the goal is not changed during the production period, then $y_k$ and $t_k$ are equal to zero. If the goal is changed after production has started, $y_k$ is equal to $y$ at the time the goal is changed, and $t_k$ is equal to the elapsed production time $t$ at the time the goal is changed.

The ratio of the actual production quality or quantity by continuous measurement to the goal as determined in the equation above is $$r = \frac{\text{actual production}}{\text{goal production}} = \frac{p}{y}$$

Referring now to the block schematic diagram of Fig. 1 there is shown an operable embodiment of functional elements for computing the ratio of actual production versus the goal production as expressed above.

At the beginning of the production period the value for total production goal $y_x$ is set on a graduated selector 10 and the value for the total production time $t_2$ is set on graduated selector 20. Each of the selectors 10 and 20 can be a manually operated potentiometer to provide a voltage, either A.C. or D.C., proportional to the setting. The selectors 10 and 20 can also be multi-wafer switches (such as digital converters) so that the shaft position can be directly converted to a coded digital form. This converted signal can then be inserted into digital computer elements.

The voltages from the selectors 10 and 20 are fed to the add circuits 12 and 22 respectively. These add units will provide for the addition of two variables. The computation can be performed by the use of an electronic operational summing amplifier, or a serial or parallel digital arithmetic unit that is commercially available. If an operational amplifier is used, A.C. or D.C. signals representing the variable can be used. However, if the digital unit is used, signals from the selectors 10 and 20 should be first converted to a coded form. This may be accomplished by a shaft position encoder that is commercially available. The add device 12 is operative to add the following sums of variables:

$$y_x + (-)y_k$$

add device 22 adds $t_2 + (-)t_k$; and add device 18 adds $t + (-)t_k$.

The outputs of the add circuits 12 and 22 are fed to the divide circuit 14 to provide the divisional operation. The divide circuit 14 or the divide circuit 30 can be an electronic or a servo-system divider and whose output will be a voltage proportional to the division of the two variables. The division computation can also be performed by a digital arithmetic unit if it is desired that the inputs should then be in the form of coded digits. More specifically the divide unit 14 is operable to divide $(y_x - y_k)$ by $(t_2 - t_k)$.

The outputs of the divide circuit 14 and the add circuit 18 are fed to the multiply circuit 16 to provide for the multiplication operation of the ratio formula. This unit can be an electronic or a servo-system multiplier, similar to the divide circuit 14, and can also be performed by a digital arithmetic unit if it is desired that the inputs be in the form of coded digits. The multiply unit 16 is operable to feed to the add unit 28, the result of $$\frac{y_x - y_k}{t_2 - t_k} \text{ by } (t - t_k)$$

Also fed to add circuit 28 is the voltage representing $y_k$ from memory circuit 32 when there has been a goal change. The add circuit 28, operable in a manner similar to add circuits 18 and 22, then performs the operation $$\frac{y_x - y_k}{t_2 - t_k}(t - t_k) + y_k$$

It is seen from the above, the add circuits 12, 18 and 22, the divide unit 14, and the multiply unit 16 solve the equation given above for $y$.

When production begins, production counter 38 measures the production variable, such as the number of pieces being produced by the manufacturing process. The counter 38 can be either electronic or electromechanical with an input that is preferably an electrical signal representing each completed piece of production. Such a counter is described in co-pending application, Serial No. 707,035 Production Counter, filed January 3, 1958, by Walker B. Lowman. The output of the counter 38 can be switch closures, pulses, or other means of representing the total number of pieces produced.

The counts from the counter 38 are accumulated in the accumulator 36. The accumulator unit 36 can also be electronic or electromechanical and may be an electronic operational feedback integrating amplifier for an analog computation system. The output signal from the accumulator 36 will then be proportional to the integral of the number of input production counts from counter 38. An electro-mechanical accumulator such as a ball and disk integrator, may also be used. A digital accumulator can take the form of a shift register wherein the count information is taken from the production counter and shifted into the register at the time of computation. The register can then shift the information to a digital computer or to a digital to analog converter for processing in analog form. The accumulator unit 36 output contains the information $p$ that represents the actual production. The output from 36 is fed to divide circuit 30 where it is divided by the production goal $y$ to give the ratio $p/y$.

In many instances a particular goal is set for a particular time, but for one reason or another may turn out to be unrealistic. Rather than have the system continue to compute the actual production figure with an unrealistic goal there is provided in the present invention method and means for changing the goal at any time during the production period without disrupting or affecting the operation of the system.

When it has been determined that the goal for the particular process should be changed there is provided means to utilize the information already accumulated together with means for reselecting the goal without interrupting the system. To change the goal, the selector 48 enables the operator to determine at that time if the initial condition for the new computational period is to be $y_k$ equal to $y$, or equal to $p$. After this has been determined, the operator selects a new value of $y_x$ and $t_2$ on selectors 11 and 13 respectively. These selectors are identical to selectors 10 and 20. The closing of the operator's reset switch 44 provides a voltage from source 51 to the memory circuits 24 and 32 and simultaneously throws switches 15 and 17 through relay system 53 from the values of $y_k$ and $t_k$ to those which pertain at the time the new goal is selected. The memory circuits 24 and 32 are also reset to zero momentarily before the entry of $y_k$ and $t_k$ to insure that they contain no residual information. It is appreciated that if a digital system is used the operation of clearing the memory circuits and resetting the selectors cannot be simultaneous and must be done sequentially. This can be performed by a one shot multivibrator in combination with a relay closure system. When the goal is reset the operational steps of the various circuits to compute the mathematics of the ratio of actual versus goal is continuously performed without interruption.

Fig. 2 is a graph of the mathematical equation for representing the goal or the number of pieces that should have been produced up to any moment. $y_k$ is the actual or anticipated production at time $t_k$. $t_2$ is the total production time and $y_x$ or $y_{x2}$ are the required production goals. The value $y_x$ is a change in the value of goal from $y_{x2}$ at the time $t_k$.

The memory unit can be a servo repeat potentiometer which is clamped in its last position. At the time that the reset switch 44 is thrown the reset signal will remove the clamp on the servo and permit a new signal to be memorized on the servo driven potentiometer. The output can be a voltage proportional to the memorized variable and may be converted to a digital code by the use of a digital converter. The memory operation can also be performed by the use of a magnetic drum, tape or core memory device. Digital information relating to the variable would be put into the memory unit so it could be available for computation as it is needed.

The example described above relates to a production variable which increases from zero at the beginning of the production period to some maximum value at the end of the production period. In the illustration, the goal also accumulates from zero to some final value which has been set into the invention by means of a suitable control. If the actual measured value and the goal are varying, but not accumulating values, the invention simplifies to a computation of the ratio of a measured value to its goal at any instant without concern for time.

It should be understood that the above-described arrangements are merely illustrative of the principles of this invention, and that structural modifications can be made without departing from the scope of the invention.

What is claimed is:

1. A production ratio computer as herein described for determining $$r = \frac{p}{y}$$

wherein $r$ is the ratio, $p$ is the production variable and $y$ is the goal comprising: means for computing the value of the goal at any time when the total goal for a production period has been set as expressed $$y = \frac{y_x - y_k}{t_2 - t_k}(t - t_k) + y_k$$

where:

$t$ = elapsed time
$y_x$ = total production goal
$y_k$ = production at time $t_k$ when goal is changed during production time
$t_k$ = time when goal is changed
$t_2$ = total production time, i.e., duration of production period
$y$ = goal at any time $t$ including, a pair of selector means for selecting the voltage values $y_x$ and $t_2$, a pair of storage means for providing the voltage values $y_k$ and $t_k$ and circuit means having fed thereto said voltage values from said selector and storage means operative to solve $$\frac{y_x - y_k}{t_2 - t_k}(t - t_k) + y_k$$

to provide the voltage $y$, said pair of storage means connected to the said circuit means to provide the voltage $y_k$ for the production when the goal is changed and voltage $t_k$ for the time when the goal is changed; means for determining the production variable $p$, and means having fed thereto said values $p$ and $y$ for performing the operation $p/y$.

2. A computer substantially as set forth in claim 1 wherein said means for determining the production count $p$ comprises a counter and an accumulator for accumulating the counts.

3. A computer substantially as set forth in claim 1 and further including reset means for resetting said first and second storage means when the goal is changed during production.

4. A computer substantially as set forth in claim 1 and further including second means for selecting said value $y_x$, second means for selecting the value $t_2$, and switching means to switch from said first to said second means when said goal is changed.

5. A computer substantially as set forth in claim 1 wherein said voltages $t_k$ and $y_k$ are equal to zero thereby indicative that the production goal has not been changed during said production period.

6. A computer substantially as set forth in claim 5 wherein said means for determining the production count $p$ comprises a counter and an accumulator for accumulating the counts.

7. A computer substantially as set forth in claim 5 and further including reset means for resetting said first and second memory means when the goal is changed during production.

8. A computer substantially as set forth in claim 5 and further including second means for selecting said value $y_x$, second means for selecting the value $t_2$, and switching means to switch from said first to said second means when said goal is changed.

9. A production ratio computer as herein described for determining $$r = \frac{p}{y}$$

wherein $r$ is the ratio, $p$ is the production variable and $y$ is the goal comprising: means for computing the value of the goal at any time when the total goal for a production period has been set as expressed $$y = \frac{y_x - y_k}{t_2 - t_k}(t - t_k) + y_k$$

where:

$t$=elapsed time
$y_x$=total production goal
$y_k$=production at time $t_k$ when goal is changed during production time
$t_k$=time when goal is changed
$t_2$=total production time, i.e., duration of production period
$y$=goal at any time $t$ including: means for selecting the voltage value for $y_x$, a first circuit and means for feeding said voltage to said circuit, means for selecting a voltage value for $t_2$, a second circuit and means for feeding said time voltage to said second circuit, a first memory means for providing a voltage value for $y_k$, and means for feeding said voltage $y_k$ to said first circuit, said first circuit operable to add $y_k + (-)y_k$, a second memory means for providing a voltage value for $t_k$, and means for feeding said voltage $t_k$ to said second circuit, said second circuit operable to add $t_2 + (-)t_k$, a first divide means and means for feeding the results of said first and second circuits thereto to divide $(y_x - y_k)$ by $(t_2 - t_k)$, a multiply means and means feeding the output of said divide means thereto, a third circuit, a timing means for providing a voltage value for $t$, means for applying said time voltage $t$ and said voltage $t_k$ from said second memory means to said third circuit, said third circuit operable to add $t + (-)t_k$, means to apply the output of said third circuit to said multiply means to multiply the result of said divide means by $(t - t_k)$, a fourth circuit and means for feeding the output of said mutiply means and said second memory means thereto, said fourth circuit operable to solve $$\frac{y_x - y_k}{t_2 - t_k}(t - t_k) + y_k$$

to provide the voltage $y$, said first memory means connected to said fourth add circuit and operable to continuously store the information received therefrom to provide said voltage $y_k$ equal to the production when the goal is changed during production time, said second memory means connected to said timing means and operable to continuously store the information received therefrom to provide said voltage $t_k$ equal to time when goal is changed; means for determining the count of said production varable $p$, a second divide means, and means feeding thereto said voltage $p$ and $y$ to perform the operation of $p/y$.

10. A computer substantially as set forth in claim 9 wherein said voltages $t_k$ and $y_k$ are equal to zero thereby indicative that the production goal has not been changed during said production period.

11. A production ratio computer as herein described for determining $$r = \frac{p}{y}$$

wherein $r$ is the ratio, $p$ is the production variable and $y$ is the goal comprising means for computing the valve of the goal at any time when the total goal for a production period has been set as expressed $$y = \frac{y_x - y_k}{t_2 - t_k}(t - t_k) + y_k$$

where:

$t$=elapsed time
$y_x$=total production goal
$y_k$=production at time $t_k$ when goal is changed during production time
$t_k$=time when goal is changed
$t_2$=total production time, i.e., duration of production period
$y$=goal at any time $t$ including, selector means for selecting the voltage value for $y_x$, a first add circuit and means for feeding said voltage to said add circuit, selector means for selecting a voltage value for $t_2$, a second add circuit and means for feeding said time voltage to said second add circuit, a first memory means for providing a voltage value for $y_k$, and means for feeding said voltage $y_k$ to said first add circuit, said first add circuit operable to add $y_k + (-)y_k$, a second memory means for providing a voltage value for $t_k$, and means for feeding said voltage $t_k$ to said second add circuit, said second add circuit operable to add $t_2 + (-)t_k$, a first divide circuit and means for feeding the results of said first and second add circuits thereto to divide $(y_x - y_k)$ by $(t_2 - t_k)$, a multiply circuit and means feeding the output of said divide circuit thereto, a third add circuit, a timing means for providing a voltage value for $t$, means for applying said time voltage $t$ and said voltage from said second memory means $t_k$ to said third add circuit, said third add circuit operable to add $t + (-)t_k$, means to apply the output of said third add circuit to said multiply circuit to multiply the result of said divide circuit by $(t - t_k)$, a fourth add circuit and means for feeding the output of said multiply circuit and said second memory means thereto, said fourth add circuit operable to solve $$\frac{y_x - y_k}{t_2 - t_k}(t - t_k) + y_k$$

to thereby provide the voltage $y$, said first memory means connected to said fourth add circuit and operable to continuously store the information received therefrom to provide said voltage $y_k$ equal to the production when the goal is changed during production time, said second memory means connected to said timing means and operable to continuously store the information received therefrom to provide said voltage $t_k$ equal to time when goal is changed; means for determining the production count of said variable $p$, a second divide circuit, and means feeding thereto said voltage value of $p$ and $y$ to perform the operation of $p/y$.

References Cited in the file of this patent

UNITED STATES PATENTS

| | | |
|---|---|---|
| 2,500,545 | Herbst | Mar. 14, 1950 |
| 2,582,588 | Fennessy | Jan. 15, 1952 |
| 2,651,456 | Highstone | Sept. 8, 1953 |
| 2,787,428 | Schuck | Apr. 2, 1957 |